US011339085B2

(12) United States Patent
Cao et al.

(10) Patent No.: US 11,339,085 B2
(45) Date of Patent: May 24, 2022

(54) GLASS FIBER COMPOSITION, GLASS FIBER AND COMPOSITE MATERIAL THEREOF

(71) Applicant: JUSHI GROUP CO., LTD., Tongxiang (CN)

(72) Inventors: Guorong Cao, Tongxiang (CN); Lin Zhang, Tongxiang (CN); Wenzhong Xing, Tongxiang (CN); Xiucheng Hong, Tongxiang (CN); Zhonghua Yao, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 972 days.

(21) Appl. No.: 16/073,131

(22) PCT Filed: Nov. 21, 2017

(86) PCT No.: PCT/CN2017/112002
§ 371 (c)(1),
(2) Date: Jul. 26, 2018

(87) PCT Pub. No.: WO2019/041581
PCT Pub. Date: Mar. 7, 2019

(65) Prior Publication Data
US 2021/0206688 A1    Jul. 8, 2021

(30) Foreign Application Priority Data
Aug. 30, 2017    (CN) .......................... 201710762134.0

(51) Int. Cl.
*C03C 13/00* (2006.01)
*C03C 3/087* (2006.01)
*C03C 3/112* (2006.01)

(52) U.S. Cl.
CPC .............. *C03C 13/00* (2013.01); *C03C 3/087* (2013.01); *C03C 3/112* (2013.01); *C03C 2213/00* (2013.01)

(58) Field of Classification Search
CPC ......... C03C 13/00; C03C 3/087; C03C 3/112; C03C 2213/00
See application file for complete search history.

(56) References Cited

U.S. PATENT DOCUMENTS

| | | | | |
|---|---|---|---|---|
| 2015/0133284 A1* | 5/2015 | Yves | ........................ | C03C 3/087 501/38 |
| 2016/0362327 A1 | 12/2016 | Cao et al. | | |

FOREIGN PATENT DOCUMENTS

| | | | |
|---|---|---|---|
| CA | 2824644 A1 | 6/2012 | |
| CA | 2942671 A1 | 9/2015 | |
| CA | 3017536 A1 | 10/2016 | |
| CL | 2018002451 A1 | 11/2018 | |
| CL | 2018002753 A1 | 1/2019 | |
| CN | 101580344 A | 11/2009 | |
| CN | 102482142 A | 5/2012 | |
| CN | 103466951 A | 12/2013 | |
| CN | 103596897 A | 2/2014 | |
| CN | 104321288 A | 1/2015 | |
| CN | 105174731 A | 12/2015 | |
| CN | 106007369 A | 10/2016 | |
| EP | 3406575 A2 | 11/2018 | |
| EP | 3406576 A2 | 11/2018 | |
| EP | 3409649 A2 | 12/2018 | |
| EP | 3415474 A2 | 12/2018 | |
| JP | 2015131684 A | 7/2015 | |
| JP | 2016165506 A | 9/2016 | |
| JP | 2018502037 A | 1/2018 | |
| JP | 2018517653 A | 7/2018 | |
| RU | 2263639 C1 | 11/2005 | |
| RU | 2478585 C2 | 4/2013 | |
| RU | 2502687 C2 | 12/2013 | |
| RU | 2564886 C2 | 10/2015 | |
| WO | 2012087313 A1 | 6/2012 | |
| WO | 2015131684 A2 | 9/2015 | |
| WO | WO-2015131684 A2 * | 9/2015 | ............. C03C 3/087 |
| WO | 2016165506 A2 | 10/2016 | |
| WO | 2016165530 A2 | 10/2016 | |
| WO | 2016165531 A2 | 10/2016 | |
| WO | 2016165532 A2 | 10/2016 | |

OTHER PUBLICATIONS

WO2015131684 machine translation (Year: 2015).*
World Intellectual Property Organization (WIPO) International Search Report for PCT/CN2017/112002 dated Jun. 1, 2018 6 Pages.

*Primary Examiner* — Karl E Group
*Assistant Examiner* — Cameron K Miller
(74) *Attorney, Agent, or Firm* — Anova Law Group, PLLC

(57) ABSTRACT

A composition for producing a glass fiber, including the following components with corresponding percentage amounts by weight: $SiO_2$: 57.4-60.9%; $Al_2O_3$: greater than 17% and less than or equal to 19.8%; MgO: greater than 9% and less than or equal to 12.8%; CaO: 6.4-11.8%; SrO: 0-1.6%; $Na_2O+K_2O$: 0.1-1.1%; $Fe_2O_3$: 0.05-1%; $TiO_2$: lower than 0.8%; and $SiO_2+Al_2O_3$: lower than or equal to 79.4%. The total weight percentage of the above components in the composition is greater than 99%. The weight percentage ratio of $Al_2O_3$+MgO to $SiO_2$ is between 0.43 and 0.56, and the weight percentage ratio of CaO+MgO to $SiO_2+Al_2O_3$ is greater than 0.205. The composition can significantly increase the glass modulus, effectively reduce the glass crystallization rate, secure a desirable temperature range (ΔT) for fiber formation and enhance the refinement of molten glass, thus making it particularly suitable for high performance glass fiber production with refractory-lined furnaces.

14 Claims, No Drawings

GLASS FIBER COMPOSITION, GLASS FIBER AND COMPOSITE MATERIAL THEREOF

CROSS-REFERENCE TO RELATED APPLICATIONS

This application is a national stage entry under 35 U.S.C. § 371 of International Application No. PCT/CN2017/112002, filed on Nov. 21, 2017, which claims priority to Chinese Patent Application No. 201710762134.0 filed Aug. 30, 2017, the entire contents of both of which are incorporated herein by reference.

BACKGROUND OF THE INVENTION

Field of the Invention

The present invention relates to a glass fiber, a composition for producing the same, and a composite material comprising the same.

Description of the Related Art

Glass fiber is an inorganic fiber material that can be used to reinforce resins to produce composite materials with good performance. As a reinforcing base material for advanced composite materials, high-performance glass fibers were originally used mainly in the aerospace industry or the national defense industry. With the progress of science and technology and the development of economy, high-performance glass fibers have been widely used in civil and industrial fields such as wind blades, pressure vessels, offshore oil pipes and auto industry. In consequence, it has become an urgent challenge to develop a glass fiber that has higher strength and modulus, better forming properties, lower production risks and costs and that, meanwhile, is suitable for large-scale production with refractory-lined furnaces so as to greatly improve the cost performance of the resulting high-performance glass fiber.

S-glass is the earliest high-performance glass that is based on an MgO—$Al_2O_3$—$SiO_2$ system. According to ASTM, S-glass is a type of glass comprised mainly of such oxides as magnesia, alumina and silica, and a typical solution is S-2 glass developed by the US. The total weight percentages of $SiO_2$ and $Al_2O_3$ in the S-2 glass reaches 90% and the weight percentage of MgO is about 10%; the melting temperature of the glass is up to over 1600° C. and the forming temperature and liquidus temperature up to 1571° C. and 1470° C., respectively. Thus, the S-2 glass is difficult to melt and refine, and an excessive amount of bubbles is present in the molten glass; also, the crystallization rate of S-2 glass is fast. Therefore, it is impossible to realize large-scale production of S-2 glass with refractory-lined furnaces, and is even difficult to achieve a direct-melt production. All these lead to small production scale, low efficiency and high cost for the production of S-2 glass fiber. Relevant data shows that the elastic modulus of S-2 glass is typically 89-90 GPa.

France developed R glass that is based on an MgO—CaO—$Al_2O_3$—$SiO_2$ system; however, the total contents of $SiO_2$ and $Al_2O_3$ remains high in the traditional R glass, thus causing difficulty in fiber formation as well as a great risk of crystallization. The forming temperature of the R glass reaches 1410° C. and its liquidus temperature up to 1350° C. At the same time, there is no effective solution in the tradition R glass to improve the crystallization performance, as the ratio of Ca to Mg is inappropriately designed that leads to a significant loss of glass properties and a high crystallization rate. All these factors have caused difficulty in effectively attenuating glass fiber and consequently in realizing large-scale industrial production. Relevant data shows that the elastic modulus of the traditional R glass is typically 87-90 GPa.

Japanese patent No. JP8231240 discloses a glass fiber composition comprising the following components expressed as percentage amounts by weight: 62-67% $SiO_2$, 22-27% $Al_2O_3$, 7-15% MgO, 0.1-1.1% CaO and 0.1-1.1% $B_2O_3$. Compared with S glass, the amount of bubbles in molten glass of this composition is significantly lowered, but the difficulty of fiber formation remains high, and the forming temperature is over 1460° C.

The American patent No. PCT/US2009/068949 discloses a high-performance glass fiber composition, which contains the following components expressed as percentage amounts by weight: 62-68% $SiO_2$, 22-26% $Al_2O_3$, 8-15% MgO and 0.1-2% $Li_2O$. Compared with S glass, the forming properties of this composition is significantly improved by introducing a high content of $Li_2O$, but the liquidus temperature is still high, generally more than 1360° C., resulting in a small and even negative $\Delta T$ value which means the great difficulty of fiber formation. Moreover, the excessive amount of $Li_2O$ introduced will have some negative effects, which not only greatly increases the cost of raw materials, but also seriously affects the corrosion resistance and electrical insulation properties of glass fiber.

In general, the above-mentioned prior art for producing glass fiber faces such difficulties as high forming temperature, high difficulty in refining molten glass, excessive amount of bubbles, high liquidus temperature, high crystallization rate, and a narrow temperature range ($\Delta T$) for fiber formation. Thus, the glass fiber production in the prior art generally fails to enable an effective large-scale production at low costs.

SUMMARY OF THE INVENTION

It is one objective of the present disclosure to provide a composition for producing a glass fiber. The resulting glass fiber has relatively high modulus and improved forming properties; meanwhile, the composition for producing a glass fiber significantly lowers the liquidus temperature, crystallization rate and bubble amount of the glass, and broadens the temperature range for fiber formation. It is one objective of the present disclosure to provide a composition for producing a glass fiber. The resulting glass fiber has relatively high modulus and improved forming properties; meanwhile, the composition for producing a glass fiber significantly lowers the liquidus temperature, crystallization rate and bubble amount of the glass, and broadens the temperature range for fiber formation.

The composition for producing a glass fiber of the present invention is particularly suitable for large-scale production with refractory-lined furnaces.

To achieve the above objective, in accordance with one embodiment of the present disclosure, there is provided a composition for producing glass fiber, the composition comprising percentage amounts by weight, as follows:

| | |
|---|---|
| $SiO_2$ | 57.4-60.9% |
| $Al_2O_3$ | >17% and ≤19.8% |
| MgO | >9% and ≤12.8% |
| CaO | 6.4-11.8% |
| SrO | 0-1.6% |

-continued

| | |
|---|---|
| $Na_2O + K_2O$ | 0.1-1.1% |
| $Fe_2O_3$ | 0.05-1% |
| $TiO_2$ | <0.8% |
| $SiO_2 + Al_2O_3$ | ≤79.4% |

In addition, the combined weight percentage of the components listed above is greater than 99%, the weight percentage ratio $C1=(Al_2O_3+MgO)/SiO_2$ is 0.43-0.56, and the weight percentage ratio $C2=(CaO+MgO)/(SiO_2+Al_2O_3)$ is greater than 0.205.

In a class of this embodiment, the composition comprises the following components expressed as percentage amounts by weight:

| | |
|---|---|
| $SiO_2$ | 58.1-60.5% |
| $Al_2O_3$ | 17.1-18.8% |
| MgO | 9.1-12.5% |
| CaO | 7-11.5% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $SiO_2 + Al_2O_3$ | ≤79% |

In addition, the combined weight percentage of the components listed above is greater than 99.5%, the weight percentage ratio $C1=(Al_2O_3+MgO)/SiO_2$ is 0.435-0.525, and the weight percentage ratio $C2=(CaO+MgO)/(SiO_2+Al_2O_3)$ is 0.215-0.295.

In a class of this embodiment, the composition comprises the following components expressed as percentage amounts by weight:

| | |
|---|---|
| $SiO_2$ | 58.1-60.5% |
| $Al_2O_3$ | 17.1-18.8% |
| MgO | 9.1-11.8% |
| CaO | 7.5-11.3% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $F_2$ | <0.4% |
| $SiO_2 + Al_2O_3$ | 75.4-79% |

In addition, the weight percentage ratio $C1=(Al_2O_3+MgO)/SiO_2$ is 0.435-0.525, and the weight percentage ratio $C2=(CaO+MgO)/(SiO_2+Al_2O_3)$ is 0.215-0.295.

In a class of this embodiment, the combined weight percentage of $Al_2O_3+MgO$ is 26.1-31%.

In a class of this embodiment, the combined weight percentage of $Al_2O_3+MgO$ is 26.3-30.3%.

In a class of this embodiment, the combined weight percentage of $Al_2O_3+MgO$ is 26.3-30%.

In a class of this embodiment, the weight percentage ratio $C1=(Al_2O_3+MgO)/SiO_2$ is 0.44-0.515.

In a class of this embodiment, the weight percentage ratio $C2=(CaO+MgO)/(SiO_2+Al_2O_3)$ is 0.225-0.29.

In a class of this embodiment, the weight percentage ratio $C3=(MgO+SrO)/CaO$ is 0.8-1.6.

In a class of this embodiment, the weight percentage ratio $C3=(MgO+SrO)/CaO$ is 0.83-1.5.

In a class of this embodiment, the weight percentage ratio $C3=(MgO+SrO)/CaO$ is greater than 1 and less than or equal to 1.4.

In a class of this embodiment, the content of $SiO_2$ is 58.1-60.5% in percentage amounts by weight.

In a class of this embodiment, the content of $SiO_2$ is 58.1-59.9% in percentage amounts by weight.

In a class of this embodiment, the composition contains one or more components selected from the group consisting of $Li_2O$, $ZrO_2$, $CeO_2$, $B_2O_3$ and $F_2$ with the combined weight percentage less than 1%.

In a class of this embodiment, the composition contains $Li_2O$ with a content not greater than 0.55% in percentage amounts by weight.

In a class of this embodiment, when the weight percentage ratio $(CaO+MgO)/Al_2O_3$ is greater than 1 and the weight percentage ratio $(MgO+SrO)/CaO$ is greater than 0.9, the composition can be free of $Li_2O$.

In a class of this embodiment, the composition contains SrO with a content of 0.1-1.5% in percentage amounts by weight.

In a class of this embodiment, the composition contains SrO with a content of 0.5-1.3% in percentage amounts by weight.

In a class of this embodiment, the composition contains $Na_2O$ with a content not greater than 0.65% in percentage amounts by weight.

In a class of this embodiment, the composition contains MgO with a content greater than 11% and less than or equal to 12.5% in percentage amounts by weight.

In a class of this embodiment, the composition comprises the following components expressed as percentage amounts by weight:

| | |
|---|---|
| $SiO_2$ | 58.1-59.9% |
| $Al_2O_3$ | 17.1-18.8% |
| MgO | 9.1-11.8% |
| CaO | 7.5-11.3% |

In addition, the composition has a glass liquidus temperature not greater than 1250° C.

In a class of this embodiment, the composition has a glass liquidus temperature not greater than 1240° C.

In a class of this embodiment, the combined weight percentage of $Na_2O+K_2O$ is 0.15-0.85%.

In a class of this embodiment, the composition contains $Na_2O$ in a content not greater than 0.5% in percentage amounts by weight.

In addition, "the composition can be free of $Li_2O$" means that the composition contains no $Li_2O$ or essentially contains no $Li_2O$, or alternatively, $Li_2O$ is present in the composition, if ever, only in trace quantity with the weight percentage of 0-0.01%.

According to another aspect of this invention, a glass fiber produced with the composition for producing a glass fiber is provided.

According to yet another aspect of this invention, a composite material incorporating the glass fiber is provided.

Compared with those of S glass and R glass, the main inventive points of the composition for producing a glass fiber according to this invention lie in that, by introducing a high content of MgO, appropriately lowering the contents of $Al_2O_3$ and $SiO_2$, adjusting the content of CaO, controlling the contents of $SiO_2+Al_2O_3$ and of alkali metal oxides and keeping tight control on the ratios of $(Al_2O_3+MgO)/SiO_2$, $(CaO+MgO)/(SiO_2+Al_2O_3)$ and $(MgO+SrO)/CaO$ respectively, the composition can: 1) produce a mixture of crystal phases consisting of cordierite, anorthite, diopside and/or enstatite for glass devitrification, where all these crystal phases in certain proportions are competing for growth, so that the rate of ions rearrangement and bonding is greatly reduced and the growth rate of a single phase is retarded; thus, the devitrification rate of glass and the upper limit of crystallization temperature are effectively inhibited; 2) enhance the synergistic effect among magnesium ions, aluminum ions and alkali metal oxides, so as to achieve a better stacking structure and an increased glass modulus that is close to or even higher than that of S glass; and 3) significantly reduce the fiberizing and refining difficulties of glass and acquire an optimal temperature range for fiber formation, thus making it particularly suitable for high performance glass fiber production with refractory-lined furnaces.

Specifically, the composition for producing a glass fiber according to the present invention comprises the following components expressed as percentage amounts by weight:

| | |
|---|---|
| $SiO_2$ | 57.4-60.9% |
| $Al_2O_3$ | >17% and ≤19.8% |
| MgO | >9% and ≤12.8% |
| CaO | 6.4-11.8% |
| SrO | 0-1.6% |
| $Na_2O + K_2O$ | 0.1-1.1% |
| $Fe_2O_3$ | 0.05-1% |
| $TiO_2$ | <0.8% |
| $SiO_2 + Al_2O_3$ | ≤79.4% |

In addition, the combined weight percentage of the components listed above is greater than 99%, the weight percentage ratio $C1=(Al_2O_3+MgO)/SiO_2$ is 0.43-0.56, and the weight percentage ratio $C2=(CaO+MgO)/(SiO_2+Al_2O_3)$ is greater than 0.205.

The effect and content of each component in the composition for producing a glass fiber is described as follows:

In a typical S glass system, the combined content of $SiO_2$ and $Al_2O_3$ by weight percentage can be up to 90%, with about 65% for $SiO_2$ and about 25% for $Al_2O_3$, and the content of MgO is about 10%. Given so high contents of $SiO_2$ and $Al_2O_3$, the melting temperature of glass would accordingly be very high and the fiber formation would be difficult, and meanwhile there will be many structural gaps in the glass network. In addition, with a shortage of sufficient free oxygen, more alumina would enter the network structure, resulting in a large number of aluminum ions, together with magnesium ions, filling in the network gaps, and thus the risk of crystallization and phase separation is increased; besides, as there is no effective competition in the crystallization process, the crystallization tendency of cordierite will be very strong, the upper limit temperature and rate of crystallization are both high and the grain size of crystals is large. All the fore mentioned problems and risks are addressed with the configuration of the composition for producing a glass fiber in this invention.

$SiO_2$ is a main oxide forming the glass network and has the effect of stabilizing all the components. In the composition for producing a glass fiber of the present invention, the content range of $SiO_2$ is 57.4-60.9%. The lower limit is set at 57.4%, so that the resulting glass would have sufficient mechanical properties; and the upper limit is set at 60.9%, which is obviously different from that of S glass and helps to prevent excessively high viscosity and liquidus temperature that would otherwise cause difficulty for large-scale production. Preferably, the $SiO_2$ content range in this invention can be 58.1-60.5%, and more preferably can be 58.1-59.9%.

$Al_2O_3$ is another main oxide forming the glass network. When combined with $SiO_2$, it can have a substantive effect on the mechanical properties of the glass and a significant effect on preventing glass phase separation and on crystallization resistance. The content range of $Al_2O_3$ in this invention is greater than 17% and less than or equal to 19.8%. In order to ensure sufficient mechanical properties, especially modulus, the $Al_2O_3$ content should be greater than 17%, which is obviously different from that of E glass. However, the $Al_2O_3$ content should not be excessively high. Its content being over 20% would significantly increase the risks of glass phase separation and crystallization, thus resulting in too high a liquidus temperature and crystallization rate which are not suitable for large-scale production. Therefore, the $Al_2O_3$ content should not be greater than 19.8%, which is obviously different from that of S glass. Preferably, the $Al_2O_3$ content can be 17.1-19.4%, more preferably 17.1-18.8%.

In addition, the combined content of $SiO_2+Al_2O_3$ in this invention can be lower than or equal to 79.4%, preferably lower than or equal to 79%, and more preferably can be 75.4-79%. By keeping a tight control on the contents of $SiO_2$ and $Al_2O_3$ respectively and on their total amount, the composition for producing a glass fiber according to the present invention can not only decrease the gap ratio of the network structure and reduce the fiberizing difficulty and crystallization risk, but also acquire sufficiently high mechanical properties, particularly high modulus that could be close to or even higher than that of S glass, thus making it suitable for large-scale production with refractory-lined furnaces under relatively low temperatures.

In the prevent invention, CaO, MgO and SrO primarily have the effect of improving the mechanical properties of glass, controlling the glass crystallization and regulating the viscosity and hardening rate of molten glass. Researches show that, as CaO is generally absent from an S glass composition where there is a shortage of sufficient free oxygen, a high content of MgO would not provide an adequate amount of free oxygen for aluminum ions, but instead tend to retain oxygen ions near itself when filling in the network gaps. By contrast, the composition for producing a glass fiber of this invention introduces CaO with a content range of 6.4-11.8%. With such introduction, calcium ions would provide considerable free oxygen while filling in the network gaps, and form a synergistic effect in stacking structure together with magnesium ions. Thus, a more compact structural stacking would be achieved, a mixture of crystal phases is obtained during the crystallization process that consists of cordierite ($Mg_2Al_4Si_5O_{18}$), anorthite ($CaAl_2Si_2O_8$), diopside ($CaMgSi_2O_6$) and/or enstatite ($CaMgSi_2O_6$), and the hardening rate of molten glass as well as the cooling effect during fiber attenuation will be optimized. However, in view of a high content of MgO, the introduced amount of CaO should not be greater than 11.8%. That is because, on the one hand, an excessive amount of calcium ions would cause diopside and/or anorthite to be the main crystal phases, thus significantly weakening the competition between cordierite and these two phases, and no satisfactory control on the crystallization temperature and rate could be achieved; on the other hand, a high total amount of CaO and MgO also would not help to offer high mechanical properties of glass. At the same time, the content of CaO should not be lower than 6.4%, as too low a content would not be able to provide either considerable free oxygen or sufficient amount of calcium ions that would otherwise produce an effective synergistic effect in structural stacking together with a high content of magnesium ions, and thus the crystal phases of diopside and anorthite obtained during glass crystallization are not sufficient to compete for growth against cordierite. Preferably, the content range of CaO is 7-11.5%, more preferably can be 7.5-11.3%, and still more preferably can be 8.1-11.3%.

In the composition for producing a glass fiber of the present invention, the content range of MgO can be greater than 9% and less than or equal to 12.8%. In order to ensure sufficiently high mechanical properties, especially modulus, the MgO content is set to be greater than 9%, which is obviously different from the corresponding value of E glass. Meanwhile, the inventors find that, when the content of MgO in the composition is further increased to be over 10%, which defines the approximate value of MgO for S glass, or even over 11%, the crystallization temperature and rate have not been noticeably increased and are still much lower than those of S glass. This is perhaps because in an S glass system, an increased amount of MgO would result in the fast growth of cordierite as the single crystal phase during crystallization, but in the composition of this invention, an increased amount of MgO would help to create competitive growth among different crystal phases, without having significant negative impacts on the crystallization performance of glass as long as it is kept within an appropriate range. However, when the MgO content reaches 12.5%, the above advantages will be greatly diminished, and when it comes over 12.8%, the risk of phase separation may occur, rendering it unsuitable for large-scale production. Therefore, the content of MgO should not be greater than 12.8%. Preferably, the content range of MgO can be 9.1-12.5%. In some embodiments, preferably the content range of MgO can be 9.1-11.8%, and in some other embodiments, preferably the content range of MgO can be greater than 11% but less than or equal to 12.5%.

Meanwhile, considering the differences of ionic radius and field strength between $Al^{3+}$ ions and $Mg^{2+}$ ions, and considering the common demand of these two ions for free oxygen and network gap filling, it is necessary to reasonably control the ratios of each of the two ions to silicon oxide, so that a better structural stacking and higher resistance to glass crystallization could be achieved. In the composition for producing a glass fiber of the present invention, the range of weight percentage ratio $C1=(Al_2O_3+MgO)/SiO_2$ can be 0.43-0.56, more preferably can be 0.435-0.525, and still more preferably can be 0.44-0.515. In the composition for producing a glass fiber of the present invention, the combined content range of $Al_2O_3+MgO$ can be 26.1-31%, more preferably can be 26.3-30.3%, and still more preferably can be 26.3-30%.

In order to produce a mixture of crystal phases consisting of cordierite, anorthite, diopside and/or enstatite, where the dominant role of a single phase can be avoided and all these crystal phases in certain proportions are competing for growth so that the rate of ions rearrangement and bonding is significantly reduced, the growth rate of a single crystal phase is retarded, and thus the devitrification rate of glass and the upper limit of crystallization temperature are effectively inhibited, in the composition for producing a glass fiber of the present invention, the range of the weight percentage ratio $C2=(CaO+MgO)/(SiO_2+Al_2O_3)$ can be greater than 0.205, preferably can be 0.215-0.295, and still more preferably can be 0.225-0.29.

In the composition for producing a glass fiber of the present invention, the content range of SrO can be 0-1.6%. Many researches show that, when their ratios are rational, the technical effect of the CaO, MgO and SrO ternary mixed alkali earth effect is noticeably better than that of the CaO and MgO binary mixed alkali earth effect. With such ternary mixed effect, a compact stacking structure forms more easily and thereby the glass has better crystallization, mechanical and optical properties. Since the ionic radiuses of $Mg^{2+}$, $Ca^{2+}$ and $Sr^{2+}$ sequentially become bigger and their ion field strengths sequentially become lower, in order to achieve a compact stacking structure, the matching between the numbers of three types of ions becomes very important. What is particularly noteworthy is that, an appropriate amount of SrO is introduced in the glass fiber composition of the present invention, and, by way of a rationally adjusted ratio of $C3=(MgO+SrO)/CaO$, the temperature and rate of the glass crystallization can be effectively controlled and the hardening rate of molten glass can be optimized. Preferably, the content range of SrO can be 0.1-1.5%, more preferably can be 0.5-1.3%. The inventors find that, in the glass system according to the present invention, when the SrO content is within 0.5-1.3%, the glass will have a better ternary mixed alkali earth effect and a better cost performance ratio.

In addition, the range of the weight percentage ratio $C3=(MgO+SrO)/CaO$ can be 0.8-1.6, preferably can be 0.83-1.5, and still more preferably greater than 1 and less than or equal to 1.4.

Both $K_2O$ and $Na_2O$ can reduce glass viscosity and are good fluxing agents. They can also provide considerable free oxygen and produce a good synergistic effect in combination with aluminum and magnesium ions, so as to create a more compact stacking structure. In the composition for producing a glass fiber of the present invention, the total content range of $Na_2O+K_2O$ can be 0.1-1.1%, preferably can be 0.15-1%, and more preferably can be 0.15-0.85%. Besides, in order to ensure the corrosion resistance of glass fiber and excellent cooling effect on the fiber cones, the content range of $Na_2O$ can be lower than or equal to 0.65%, preferably lower than or equal to 0.5%.

$Fe_2O_3$ facilitates the melting of glass and can also improve the crystallization performance of glass. However, since ferric ions and ferrous ions have a coloring effect, the introduced amount should be limited. Therefore, in the composition for producing a glass fiber of the present invention, the content range of $Fe_2O_3$ can be 0.05-1%, preferably 0.05-0.65%.

$TiO_2$ can not only reduce the glass viscosity at high temperatures, but also has a certain fluxing effect. However, since titanium ions in combination with ferric ions can have a certain coloring effect, which will affect the appearance of glass fiber-reinforced articles and cause the noticeable increase of glass density, the introduced amount should be limited. Therefore, in the composition for producing a glass fiber of the present invention, the content range of $TiO_2$ is lower than 0.8%, preferably lower than or equal to 0.75%, and more preferably lower than or equal to 0.6%.

In addition, the above components are the main components of the composition according to the present invention, with the total weight percentage greater than 99%.

In addition, the glass fiber composition of the present invention can also include small amounts of other components with a total content lower than 1%. Furthermore, the glass fiber composition of the present invention can include one or more components with a total content lower than 1% selected from the group consisting of $Li_2O$, $ZrO_2$, $CeO_2$, $B_2O_3$ and $F_2$. Furthermore, the glass fiber composition of the present invention can include $Li_2O$ with a content range of 0-0.75%, as $Li_2O$ can significantly reduce the glass viscosity and improve the glass melting performance. Also, a small amount of $Li_2O$ provides considerable free oxygen, which helps more aluminum ions to form tetrahedral coordination, enhances the network structure of the glass and further improves the crystallization performance of glass. However, an excessive amount of $Li_2O$ would be very costly and, with high ionic field strength and strong accumulation effect, the lithium ions in combination with magnesium ions would easily form a synergistic accumulation effect, which adversely affects the crystallization rate of glass. Furthermore, the glass fiber composition of the present invention can include $Li_2O$ with a content lower than or equal to 0.55%. Furthermore, the glass fiber composition of the present invention can include $F_2$ with a content lower than 0.4% and generally in the form of impurities contained in the glass raw materials.

Furthermore, the content of the main components of the composition for producing a glass fiber of the present invention can be greater than 99.3%, more preferably can be greater than 99.5%.

Furthermore, in order to control the production costs, the composition for producing a glass fiber of the present invention can be free of $Li_2O$, particularly when the weight percentage ratio $(CaO+MgO)/Al_2O_3>1$ and the weight percentage ratio $(MgO+SrO)/CaO>0.9$. Absense of $Li_2O$ in this case will not have negative impacts on the properties and melting performance of the glass.

Furthermore, the composition for producing a glass fiber of the present invention has a liquidus temperature lower than or equal to 1260° C., preferably lower than or equal to 1250° C., and more preferably lower than or equal to 1240° C.

In the composition for producing a glass fiber of the present invention, the beneficial effects produced by the aforementioned selected ranges of the components will be explained by way of examples through the specific experimental data.

The following are examples of preferred content ranges of the components contained in the composition for producing a glass fiber according to the present invention.

Composition 1

The composition for producing a glass fiber according to the present invention comprises the following components expressed as percentage amounts by weight:

| | |
|---|---|
| $SiO_2$ | 58.1-60.5% |
| $Al_2O_3$ | 17.1-18.8% |
| MgO | 9.1-12.5% |
| CaO | 7-11.5% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $SiO_2 + Al_2O_3$ | ≤79% |

In addition, the combined weight percentage of the components listed above is greater than 99.5%, the weight percentage ratio $C1=(Al_2O_3+MgO)/SiO_2$ is 0.435-0.525, and the weight percentage ratio $C2=(CaO+MgO)/(SiO_2+Al_2O_3)$ is 0.215-0.295.

Composition 2

The composition for producing a glass fiber according to the present invention comprises the following components expressed as percentage amounts by weight:

| | |
|---|---|
| $SiO_2$ | 58.1-60.5% |
| $Al_2O_3$ | 17.1-18.8% |
| MgO | 9.1-11.8% |
| CaO | 7.5-11.3% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $F_2$ | <0.4% |
| $SiO_2 + Al_2O_3$ | 75.4-79% |

In addition, the weight percentage ratio $C1=(Al_2O_3+MgO)/SiO_2$ is 0.435-0.525, and the weight percentage ratio $C2=(CaO+MgO)/(SiO_2+Al_2O_3)$ is 0.215-0.295.

Composition 3

The composition for producing a glass fiber according to the present invention comprises the following components expressed as percentage amounts by weight:

| | |
|---|---|
| $SiO_2$ | 57.4-60.9% |
| $Al_2O_3$ | >17% and ≤19.8% |
| MgO | >9% and ≤12.8% |
| CaO | 6.4-11.8% |
| SrO | 0-1.6% |
| $Na_2O + K_2O$ | 0.1-1.1% |
| $Fe_2O_3$ | 0.05-1% |
| $TiO_2$ | <0.8% |
| $SiO_2 + Al_2O_3$ | ≤79.4% |
| $Al_2O_3 + MgO$ | 26.3-30.3% |

In addition, the combined weight percentage of the components listed above is greater than 99%, the weight percentage ratio $C1=(Al_2O_3+MgO)/SiO_2$ is 0.43-0.56, and the weight percentage ratio $C2=(CaO+MgO)/(SiO_2+Al_2O_3)$ is greater than 0.205.

Composition 4

The composition for producing a glass fiber according to the present invention comprises the following components expressed as percentage amounts by weight:

| | |
|---|---|
| $SiO_2$ | 58.1-60.5% |
| $Al_2O_3$ | 17.1-18.8% |
| MgO | 9.1-12.5% |
| CaO | 7-11.5% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $SiO_2 + Al_2O_3$ | ≤79% |

In addition, the combined weight percentage of the components listed above is greater than 99.5%, the weight percentage ratio $C1=(Al_2O_3+MgO)/SiO_2$ is 0.44-0.515, and the weight percentage ratio $C2=(CaO+MgO)/(SiO_2+Al_2O_3)$ is 0.215-0.295.

Composition 5

The composition for producing a glass fiber according to the present invention comprises the following components expressed as percentage amounts by weight:

| | |
|---|---|
| $SiO_2$ | 58.1-60.5% |
| $Al_2O_3$ | 17.1-18.8% |
| MgO | 9.1-12.5% |
| CaO | 7-11.5% |
| SrO | 0-1.6% |
| $Na_2O + K_2O$ | 0.15-1% |
| $Li_2O$ | 0-0.75% |
| $Fe_2O_3$ | 0.05-1% |

-continued

| | |
|---|---|
| TiO$_2$ | <0.8% |
| SiO$_2$ + Al$_2$O$_3$ | ≤79% |

In addition, the combined weight percentage of the components listed above is greater than 99.5%, the weight percentage ratio C1=(Al$_2$O$_3$+MgO)/SiO$_2$ is 0.435-0.525, and the weight percentage ratio C2=(CaO+MgO)/(SiO$_2$+Al$_2$O$_3$) is 0.225-0.29.

Composition 6

The composition for producing a glass fiber according to the present invention comprises the following components expressed as percentage amounts by weight:

| | |
|---|---|
| SiO2 | 57.4-60.9% |
| Al$_2$O$_3$ | >17% and ≤19.8% |
| MgO | >9% and ≤12.8% |
| CaO | 6.4-11.8% |
| SrO | 0-1.6% |
| Na$_2$O + K$_2$O | 0.1-1.1% |
| Fe$_2$O$_3$ | 0.05-1% |
| TiO$_2$ | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, the weight percentage ratio C2=(CaO+MgO)/(SiO$_2$+Al$_2$O$_3$) is greater than 0.205, and the weight percentage ratio C3=(MgO+SrO)/CaO is 0.83-1.5.

Composition 7

The composition for producing a glass fiber according to the present invention comprises the following components expressed as percentage amounts by weight:

| | |
|---|---|
| SiO$_2$ | 57.4-60.9% |
| Al$_2$O$_3$ | >17% and ≤19.8% |
| MgO | >9% and ≤12.8% |
| CaO | 6.4-11.8% |
| SrO | 0-1.6% |
| Na$_2$O + K$_2$O | 0.1-1.1% |
| Fe$_2$O$_3$ | 0.05-1% |
| TiO$_2$ | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, the weight percentage ratio C2=(CaO+MgO)/(SiO$_2$+Al$_2$O$_3$) is greater than 0.205, and the composition contains Li$_2$O with a content lower than or equal to 0.55% by weight.

Composition 8

The composition for producing a glass fiber according to the present invention comprises the following components expressed as percentage amounts by weight:

| | |
|---|---|
| SiO$_2$ | 57.4-60.9% |
| Al$_2$O$_3$ | >17% and ≤19.8% |
| MgO | >9% and ≤12.8% |
| CaO | 6.4-11.8% |
| SrO | 0-1.6% |
| Na$_2$O + K$_2$O | 0.1-1.1% |
| Fe$_2$O$_3$ | 0.05-1% |
| TiO$_2$ | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, the weight percentage ratio C2=(CaO+MgO)/(SiO$_2$+Al$_2$O$_3$) is greater than 0.205, and when the weight percentage ratio (CaO+MgO)/Al$_2$O$_3$ is greater than 1 and the weight percentage ratio (MgO+SrO)/CaO greater than 0.9, the composition is free of Li$_2$O.

Composition

The composition for producing a glass fiber according to the present invention comprises the following components expressed as percentage amounts by weight:

| | |
|---|---|
| SiO$_2$ | 57.4-60.9% |
| Al$_2$O$_3$ | >17% and ≤19.8% |
| MgO | >9% and ≤12.8% |
| CaO | 6.4-11.8% |
| SrO | 0.5-1.3% |
| Na$_2$O + K$_2$O | 0.1-1.1% |
| Fe$_2$O$_3$ | 0.05-1% |
| TiO$_2$ | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, and the weight percentage ratio C2=(CaO+MgO)/(SiO$_2$+Al$_2$O$_3$) is greater than 0.205.

Composition 10

The composition for producing a glass fiber according to the present invention comprises the following components expressed as percentage amounts by weight:

| | |
|---|---|
| SiO$_2$ | 57.4-60.9% |
| Al$_2$O$_3$ | >17% and ≤19.8% |
| MgO | >9% and ≤12.8% |
| CaO | 6.4-11.8% |
| SrO | 0-1.6% |
| Na$_2$O + K$_2$O | 0.1-1.1% |
| Na$_2$O | ≤0.65% |
| Fe$_2$O$_3$ | 0.05-1% |
| TiO$_2$ | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, and the weight percentage ratio C2=(CaO+MgO)/(SiO$_2$+Al$_2$O$_3$) is greater than 0.205.

Composition 11

The composition for producing a glass fiber according to the present invention comprises the following components expressed as percentage amounts by weight:

| | |
|---|---|
| SiO$_2$ | 57.4-60.9% |
| Al$_2$O$_3$ | >17% and ≤19.8% |
| MgO | >11% and ≤12.5% |
| CaO | 6.4-11.8% |
| SrO | 0-1.6% |
| Na$_2$O + K$_2$O | 0.1-1.1% |
| Fe$_2$O$_3$ | 0.05-1% |
| TiO2 | <0.8% |
| SiO$_2$ + Al$_2$O$_3$ | ≤79.4% |

In addition, the combined weight percentage of the components listed above is greater than 99%, the weight percentage ratio C1=(Al$_2$O$_3$+MgO)/SiO$_2$ is 0.43-0.56, and the weight percentage ratio C2=(CaO+MgO)/(SiO$_2$+Al$_2$O$_3$) is greater than 0.205.

Composition 12

The composition for producing a glass fiber according to the present invention comprises the following components expressed as percentage amounts by weight:

| | |
|---|---|
| $SiO_2$ | 58.1-59.9% |
| $Al_2O_3$ | 17.1-18.8% |
| MgO | 9.1-11.8% |
| CaO | 7.5-11.3% |
| SrO | 0-1.6% |
| $Na_2O + K_2O$ | 0.15-1% |
| $Li_2O$ | 0-0.75% |
| $Fe_2O_3$ | 0.05-1% |
| $TiO_2$ | <0.8% |
| $SiO_2 + Al_2O_3$ | ≤79% |

In addition, the combined weight percentage of the components listed above is greater than 99.5%, the weight percentage ratio $C1=(Al_2O_3+MgO)/SiO_2$ is 0.435-0.525, the weight percentage ratio $C2=(CaO+MgO)/(SiO_2+Al_2O_3)$ is 0.215-0.295, and the composition has a liquidus temperature lower than or equal to 1250° C.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the composition for producing a glass fiber expressed as percentage amounts by weight are: 57.4-60.9% $SiO_2$, greater than 17% and less than or equal to 19.8% $Al_2O_3$, greater than 9% and less than or equal to 12.8% MgO, 6.4-11.8% CaO, 0-1.6% SrO, 0.1-1.1% $Na_2O+K_2O$, 0.05-1% $Fe_2O_3$, and lower than 0.8% $TiO_2$, wherein the range of the combined weight percentage of these components is greater than 99%, the range of the total weight percentage $SiO_2+Al_2O_3$ is lower than or equal to 79.4%, the range of the weight percentage ratio $C1=(Al_2O_3+MgO)/SiO_2$ is 0.43-0.56, and the range of the weight percentage ratio $C2=(CaO+MgO)/(SiO_2+Al_2O_3)$ is greater than 0.205. The composition can not only increase the glass modulus, improve the forming properties of the glass and reduce the bubble amount of molten glass, but also significantly lower the liquidus temperature and crystallization rate of the glass, and broaden the temperature range (ΔT) for fiber formation, thereby making it particularly suitable for high performance glass fiber production with refractory-lined furnaces.

The specific content values of $SiO_2$, $Al_2O_3$, CaO, MgO, SrO, $Na_2O$, $K_2O$, $Fe_2O_3$ and $TiO_2$ in the composition for producing a glass fiber of the present invention are selected to be used in the examples, and comparisons with S glass, traditional R glass and improved S glass are made in terms of the following seven property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) ΔT value, the difference between the forming temperature and the liquidus temperature, indicating the temperature range at which fiber drawing can be performed.

(4) Elastic modulus, the modulus defining the ability of glass to resist elastic deformation, which is to be measured on bulk glass as per ASTM E1876.

(5) Crystal phase composition, which represents the composition of main crystal phases in the glass melt to be measured and evaluated by using XRD method. The four main crystal phases, i.e. cordierite, anorthite, diopside and enstatite are abbreviated as COR, ANO, DIO and ENS respectively in the tables below. The abbreviations of different crystals are placed in a top-down manner based on their respective contents. For instance, in example A1 of Table 1A, the placing of these abbreviations means the contents of DIO, COR and ANO successively decrease.

(6) Crystallization area ratio, to be determined in a procedure set out as follows: Cut the bulk glass appropriately to fit in with a porcelain boat trough and then place the cut glass bar sample into the porcelain boat. Put the porcelain boat with the glass bar sample into a gradient furnace for crystallization and keep the sample for heat preservation for 6 hours. Take the boat with the sample out of the gradient furnace and air-cool it to room temperature. Finally, examine and measure the amounts and dimensions of crystals on the surfaces of each sample within the temperature range of 1050-1150° C. from a microscopic view by using an optical microscope, and then calculate the area ratio of crystallization. A high area ratio would mean a high crystallization tendency and high crystallization rate.

(7) Amount of bubbles, to be determined in a procedure set out as follows: Use specific moulds to compress the glass batch materials in each example into samples of same dimension, which will then be placed on the sample platform of a high temperature microscope. Heat the samples according to standard procedures up to the pre-set spatial temperature 1500° C. and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

The aforementioned seven parameters and the methods of measuring them are well-known to one skilled in the art. Therefore, these parameters can be effectively used to explain the properties of the composition for producing a glass fiber of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirement.

Comparisons of the property parameters of the examples of the composition for producing a glass fiber according to the present invention with those of the S glass, traditional R glass and improved S glass are further made below by way of tables, where the component contents of the composition for producing a glass fiber are expressed as weight percentage. What needs to be made clear is that the total amount of the components in the examples is slightly less than 100%, and it should be understood that the remaining amount is trace impurities or a small amount of components which cannot be analyzed.

TABLE 1A

|  |  | A1 | A2 | A3 | A4 | A5 | A6 | A7 |
|---|---|---|---|---|---|---|---|---|
| Component | $SiO_2$ | 60.50 | 59.80 | 59.15 | 59.15 | 58.65 | 59.45 | 59.15 |
|  | $Al_2O_3$ | 17.60 | 17.60 | 17.60 | 18.30 | 18.80 | 17.60 | 17.60 |
|  | CaO | 9.55 | 10.25 | 10.25 | 9.55 | 9.55 | 9.55 | 11.30 |
|  | MgO | 10.35 | 10.35 | 11.00 | 11.00 | 11.00 | 11.40 | 9.95 |
|  | SrO | — | — | — | — | — | — | — |
|  | $Na_2O$ | 0.34 | 0.34 | 0.34 | 0.34 | 0.34 | 0.34 | 0.34 |
|  | $K_2O$ | 0.39 | 0.39 | 0.39 | 0.39 | 0.39 | 0.39 | 0.39 |
|  | $Li_2O$ | — | — | — | — | — | — | — |
|  | $Fe_2O_3$ | 0.44 | 0.44 | 0.44 | 0.44 | 0.44 | 0.44 | 0.44 |
|  | $TiO_2$ | 0.58 | 0.58 | 0.58 | 0.58 | 0.58 | 0.58 | 0.58 |
| Ratio | C1 | 0.462 | 0.467 | 0.484 | 0.495 | 0.508 | 0.488 | 0.466 |
|  | C2 | 0.255 | 0.266 | 0.277 | 0.265 | 0.265 | 0.272 | 0.277 |
|  | C3 | 1.084 | 1.010 | 1.073 | 1.152 | 1.152 | 1.194 | 0.881 |
| Parameter | Forming temperature/° C. | 1322 | 1312 | 1307 | 1310 | 1308 | 1308 | 1305 |
|  | Liquidus temperature/° C. | 1220 | 1215 | 1217 | 1214 | 1211 | 1219 | 1207 |
|  | ΔT/° C. | 102 | 97 | 90 | 96 | 97 | 89 | 98 |
|  | Elastic modulus/GPa | 91.6 | 91.5 | 92.4 | 93.0 | 93.8 | 93.1 | 91.2 |
|  | Crystal phase composition | DIO COR ANO | DIO COR ANO | COR DIO ANO | COR DIO ANO | COR ANO DIO | COR DIO ENS | DIO ANO COR |
|  | Crystallization area ratio/% | 21 | 18 | 20 | 18 | 15 | 20 | 13 |
|  | Amount of bubbles/pcs | 13 | 10 | 9 | 8 | 10 | 9 | 7 |

TABLE 1B

|  |  | A8 | A9 | A10 | A11 | A12 | A13 | A14 |
|---|---|---|---|---|---|---|---|---|
| Component | $SiO_2$ | 57.40 | 60.10 | 58.55 | 58.55 | 59.55 | 59.10 | 59.10 |
|  | $Al_2O_3$ | 19.80 | 17.10 | 19.40 | 18.60 | 18.80 | 19.80 | 18.40 |
|  | CaO | 8.45 | 10.40 | 7.30 | 8.10 | 6.40 | 7.50 | 9.25 |
|  | MgO | 11.20 | 9.75 | 11.30 | 11.00 | 11.80 | 10.80 | 10.80 |
|  | SrO | 0.50 | — | 0.75 | 1.00 | 1.00 | — | — |
|  | $Na_2O$ | 0.40 | 0.40 | 0.40 | 0.40 | 0.40 | 0.35 | 0.40 |
|  | $K_2O$ | 0.34 | 0.34 | 0.34 | 0.34 | 0.34 | 0.24 | 0.34 |
|  | $Li_2O$ | 0.55 | 0.55 | 0.55 | 0.55 | 0.40 | 0.75 | 0.30 |
|  | $Fe_2O_3$ | 0.46 | 0.46 | 0.46 | 0.46 | 0.46 | 0.46 | 0.46 |
|  | $TiO_2$ | 0.65 | 0.65 | 0.70 | 0.75 | 0.40 | 0.75 | 0.70 |
|  | $F_2$ | — | — | — | — | 0.20 | — | — |
| Ratio | C1 | 0.540 | 0.447 | 0.524 | 0.506 | 0.514 | 0.518 | 0.494 |
|  | C2 | 0.255 | 0.261 | 0.239 | 0.248 | 0.233 | 0.232 | 0.259 |
|  | C3 | 1.385 | 0.938 | 1.651 | 1.481 | 2.000 | 1.440 | 1.168 |
| Parameter | Forming temperature/° C. | 1305 | 1299 | 1301 | 1299 | 1301 | 1305 | 1300 |
|  | Liquidus temperature/° C. | 1230 | 1215 | 1220 | 1217 | 1212 | 1232 | 1210 |
|  | ΔT/° C. | 75 | 84 | 81 | 82 | 89 | 73 | 90 |
|  | Elastic modulus/GPa | 93.3 | 91.3 | 93.1 | 92.5 | 93.3 | 93.0 | 92.4 |
|  | Crystal phase composition | COR ANO DIO | DIO ANO COR | COR ANO DIO | COR ANO DIO | COR DIO ANO | COR DIO ANO | COR DIO ANO |
|  | Crystallization area ratio/% | 31 | 23 | 28 | 24 | 21 | 35 | 21 |
|  | Amount of bubbles/pcs | 9 | 8 | 10 | 9 | 5 | 6 | 8 |

TABLE 1C

|  |  | A15 | A16 | A17 | A18 | A19 | A20 | A21 |
|---|---|---|---|---|---|---|---|---|
| Component | $SiO_2$ | 59.70 | 59.70 | 59.70 | 59.70 | 59.70 | 59.70 | 59.70 |
|  | $Al_2O_3$ | 17.80 | 17.80 | 17.80 | 17.80 | 17.80 | 17.80 | 17.80 |
|  | CaO | 9.80 | 9.50 | 8.70 | 10.85 | 9.55 | 8.15 | 7.45 |
|  | MgO | 10.40 | 10.40 | 10.40 | 9.10 | 10.40 | 11.80 | 12.50 |

TABLE 1C-continued

|  |  | A15 | A16 | A17 | A18 | A19 | A20 | A21 |
|---|---|---|---|---|---|---|---|---|
|  | SrO | 0.20 | 0.50 | 1.30 | — | — | — | — |
|  | $Na_2O$ | 0.40 | 0.40 | 0.40 | 0.40 | 0.40 | 0.40 | 0.40 |
|  | $K_2O$ | 0.34 | 0.34 | 0.34 | 0.34 | 0.34 | 0.34 | 0.34 |
|  | $Li_2O$ | — | — | — | 0.45 | 0.45 | 0.45 | 0.45 |
|  | $Fe_2O_3$ | 0.46 | 0.46 | 0.46 | 0.46 | 0.46 | 0.46 | 0.46 |
|  | $TiO_2$ | 0.65 | 0.65 | 0.65 | 0.65 | 0.65 | 0.65 | 0.65 |
| Ratio | C1 | 0.472 | 0.472 | 0.472 | 0.451 | 0.472 | 0.496 | 0.508 |
|  | C2 | 0.261 | 0.257 | 0.246 | 0.257 | 0.257 | 0.257 | 0.257 |
|  | C3 | 1.082 | 1.147 | 1.345 | 0.839 | 1.089 | 1.448 | 1.678 |
| Parameter | Forming temperature/° C. | 1312 | 1313 | 1315 | 1311 | 1309 | 1301 | 1294 |
|  | Liquidus temperature/° C. | 1217 | 1213 | 1210 | 1211 | 1219 | 1220 | 1233 |
|  | ΔT/° C. | 95 | 100 | 105 | 100 | 90 | 81 | 61 |
|  | Elastic modulus/GPa | 92.3 | 92.9 | 94.0 | 91.4 | 92.3 | 93.4 | 93.8 |
|  | Crystal phase composition | DIO COR ANO | DIO COR ANO | COR DIO ANO | DIO ANO COR | DIO COR ANO | COR DIO ANO | COR DIO ENS |
|  | Crystallization area ratio/% | 19 | 16 | 11 | 17 | 24 | 26 | 31 |
|  | Amount of bubbles/pcs | 10 | 11 | 11 | 10 | 9 | 8 | 8 |

TABLE 1D

|  |  | A22 | A23 | A24 | A25 | S glass | Traditional R glass | Improved S glass |
|---|---|---|---|---|---|---|---|---|
| Component | $SiO_2$ | 58.10 | 58.70 | 59.90 | 60.40 | 65 | 60 | 63.05 |
|  | $Al_2O_3$ | 19.40 | 18.80 | 17.60 | 17.10 | 25 | 25 | 23.05 |
|  | CaO | 10.00 | 10.00 | 10.00 | 10.00 | — | 9 | — |
|  | MgO | 10.45 | 10.45 | 10.45 | 10.45 | 10 | 6 | 12.55 |
|  | SrO | — | — | — | — | — | — | — |
|  | $Na_2O$ | 0.40 | 0.40 | 0.40 | 0.40 | — | — | — |
|  | $K_2O$ | 0.34 | 0.34 | 0.34 | 0.34 | — | — | — |
|  | $Li_2O$ | — | — | — | — | — | — | 1.35 |
|  | $Fe_2O_3$ | 0.46 | 0.46 | 0.46 | 0.46 | — | — | — |
|  | $TiO_2$ | 0.60 | 0.60 | 0.60 | 0.60 | — | — | — |
| Ratio | C1 | 0.514 | 0.498 | 0.468 | 0.456 | 0.538 | 0.517 | 0.565 |
|  | C2 | 0.264 | 0.264 | 0.264 | 0.264 | 0.111 | 0.176 | 0.146 |
|  | C3 | 1.045 | 1.045 | 1.045 | 1.045 | — | 0.667 | — |
| Parameter | Forming temperature/° C. | 1308 | 1310 | 1313 | 1315 | 1571 | 1430 | 1359 |
|  | Liquidus temperature/° C. | 1216 | 1213 | 1219 | 1225 | 1470 | 1350 | 1372 |
|  | ΔT/° C. | 92 | 97 | 94 | 90 | 101 | 80 | −13 |
|  | Elastic modulus/GPa | 92.7 | 92.7 | 91.7 | 91.2 | 90 | 89 | 90 |
|  | Crystal phase composition | COR ANO DIO | COR DIO ANO | DIO COR ANO | DIO ANO COR | COR | ANO DIO | COR ENS |
|  | Crystallization area ratio/% | 19 | 14 | 20 | 24 | 100 | 70 | 85 |
|  | Amount of bubbles/pcs | 8 | 7 | 10 | 13 | 40 | 30 | 25 |

It can be seen from the values in the above tables that, compared with the S glass, traditional R glass and improved S glass, the composition for producing a glass fiber of the present invention has the following advantages: (1) much higher elastic modulus; (2) much lower liquidus temperature and much lower crystallization area ratio, which indicate a low upper limit temperature for crystallization as well as a low crystallization rate and thus help to reduce the crystallization risk and improve the fiber drawing efficiency; (3) a much lower forming temperature, which means less difficulty in glass melting and thus help to enable large-scale production with refractory lined furnaces at lowered costs; (4) smaller amount of bubbles, which indicates a better refining of molten glass; and (5) a variety of crystal phases after glass crystallization, which helps to inhibit the crystallization rate.

At present, none of the S glass, traditional R glass or improved S glass can enable the achievement of large-scale production with refractory-lined furnaces.

Therefore, it can be seen from the above that, compared with the S glass, traditional R glass and improved S glass, the composition for producing a glass fiber of the present invention has made a breakthrough in terms of elastic modulus, crystallization temperature, crystallization rate and refining performance of the glass, with significantly improved modulus, remarkably reduced crystallization temperature and rate and relatively small amount of bubbles under the same conditions. Thus, the overall technical solution of the present invention enables an easy achievement of large-scale production with refractory-lined furnaces.

The composition for producing a glass fiber according to the present invention can be used for making glass fibers having the aforementioned properties.

The composition for producing a glass fiber according to the present invention in combination with one or more organic and/or inorganic materials can be used for preparing composite materials having improved characteristics, such as glass fiber reinforced base materials.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by such phrase as "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The composition for producing a glass fiber of the present invention results in glass fiber having higher modulus and improved forming properties; meanwhile, the composition significantly lowers the liquidus temperature, crystallization rate and bubble amount of the glass, and also broadens the temperature range ($\Delta T$) for fiber formation. Compared with the current mainstream high-performance glasses, the composition for producing a glass fiber of the present invention has made a breakthrough in terms of elastic modulus, crystallization temperature, crystallization rate and refining performance of the glass, with significantly improved modulus, remarkably reduced crystallization temperature and rate and relatively small amount of bubbles under the same conditions. Thus, the overall technical solution of the present invention enables an easy achievement of large-scale production with refractory-lined furnaces.

What is claimed is:

1. A composition for producing a glass fiber, comprising the following components with corresponding percentage amounts by weight:

| | |
|---|---|
| $SiO_2$ | 57.4-60.9% |
| $Al_2O_3$ | >17% and ≤19.8% |
| MgO | >9% and ≤12.8% |
| CaO | 8.1-10.85% |
| SrO | 0% |
| $Na_2O + K_2O$ | 0.1-1.1% |
| $Fe_2O_3$ | 0.05-1% |
| $TiO_2$ | <0.8% |
| $SiO_2 + Al_2O_3$ | ≤79.4% | wherein
a total weight percentage e f the above components is greater than 99%;
a weight percentage ratio $C1=(Al_2O_3+MgO)/SiO_2$ is between 0.43 and 0.56; and
a weight percentage ratio $C2=(CaO+MgO)/(SiO_2+Al_2O_3)$ greater than 0.205.

2. The composition of 1, comprising the following components with corresponding percentage amounts by weight:

| | |
|---|---|
| $SiO_2$ | 58.1-60.5% |
| $Al_2O_3$ | 17.1-18.8% |
| MgO | 9.1-12.5% |
| CaO | 8.1-10.85% |
| SrO | 0% |
| $Na_2O + K_2O$ | 0.15-1% |
| $Li_2O$ | 0-0.75% |
| $Fe_2O_3$ | 0.05-1% |
| $TiO_2$ | <0.8% |
| $SiO_2 + Al_2O_3$ | ≤79% | wherein
a total weight percentage of the above components is greater than 99.5%;
a weight percentage ratio $C1=(Al_2O_3+MgO)/SiO_2$ is between 0.435 and 0.525; and
a weight percentage ratio $C2=(CaO+MgO)/(SiO_2+Al_2O_3)$ is between 0.215 and 0.295.

3. The composition of claim 1, comprising the following components with corresponding percentage amounts by weight:

| | |
|---|---|
| $SiO_2$ | 58.1-60.5% |
| $Al_2O_3$ | 17.1-18.8% |
| MgO | 9.1-11.8% |
| CaO | 8.1-10.85% |
| SrO | 0% |
| $Na_2O + K_2O$ | 0.15-1% |
| $Li_2O$ | 0-0.75% |
| $Fe_2O_3$ | 0.05-1% |
| $TiO_2$ | <0.8% |
| $F_2$ | <0.4% |
| $SiO_2 + Al_2O_3$ | 75.4-79% | wherein
a weight percentage ratio $C1=(Al_2O_3+MgO)/SiO_2$ is between 0.435 and 0.525; and
a weight percentage ratio $C2=(CaO+MgO)/(SiO_2+Al_2O_3)$ is between 0.215 and 0.295.

4. The composition of claim 1, wherein a combined weight percentage $Al_2O_3+MgO$ is between 26.1% and 31%.

5. The composition of claim 1, wherein a weight percentage ratio $C3=(MgO+SrO)/CaO$ is between 0.8 and 1.6.

6. The composition of claim 1, comprising between 58.1 and 59.9 wt. % of $SiO_2$.

7. The composition of claim 1, further comprising less than 1 wt. % of $Li_2O$, $ZrO_2$, $CeO_2$, $B_2O_3$ and $F_2$, or a mixture thereof.

8. The composition of claim 1, further comprising no more than 0.55 wt. % of $Li_2O$.

9. The composition of claim 1, wherein, when the weight percentage ratio $(CaO+MgO)/Al_2O_3$ is greater than 1 and the weight percentage ratio $(MgO+SrO)/CaO$ is greater than 0.9, the composition is free of $Li_2O$.

10. The composition of claim 1, comprising no more than 0.65 wt. % of $Na_2O$.

11. The composition of claim 1, comprising MgO with a weight percentage greater than 11% and less than or equal to 12.5%.

12. The composition of claim 2, comprising the following components with corresponding percentage amounts by weight:

| | |
|---|---|
| $SiO_2$ | 58.1-59.9% |
| $Al_2O_3$ | 17.1-18.8% |
| MgO | 9.1-11.8% |
| CaO | 8.1-10.85% | wherein the composition has a liquidus temperature lower than or equal to 1250° C.

13. A glass fiber, being produced using the composition of claim 1.

14. A composite material, comprising the lass fiber of claim 13.

* * * * *